United States Patent
Kurogi et al.

(10) Patent No.: US 8,189,325 B2
(45) Date of Patent: May 29, 2012

(54) SWITCHGEAR

(75) Inventors: Takuya Kurogi, Hitachi (JP); Kenji Tsuchiya, Hitachi (JP); Naoki Nakatsugawa, Hitachinaka (JP); Takumi Ishikawa, Hitachi (JP); Nobuyuki Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 398 days.

(21) Appl. No.: 12/330,941

(22) Filed: Dec. 9, 2008

(65) Prior Publication Data

US 2009/0159569 A1    Jun. 25, 2009

(30) Foreign Application Priority Data

Dec. 18, 2007 (JP) ................... 2007-325716

(51) Int. Cl.
*H05K 7/20* (2006.01)
(52) U.S. Cl. ..................... 361/678; 218/157
(58) Field of Classification Search .............. 218/157; 361/379, 678
See application file for complete search history.

(56) References Cited

U.S. PATENT DOCUMENTS

| 4,118,755 | A | * | 10/1978 | Davies et al. | 361/678 |
| 4,403,124 | A | * | 9/1983 | Perkins et al. | 218/122 |
| 4,464,703 | A | * | 8/1984 | Davies et al. | 361/614 |
| 4,528,614 | A | * | 7/1985 | Shariff et al. | 361/678 |
| 5,710,402 | A | * | 1/1998 | Karnbach et al. | 218/157 |
| 5,892,195 | A | * | 4/1999 | Aufermann et al. | 218/157 |
| 6,227,908 | B1 | | 5/2001 | Aumeier et al. | |
| 6,410,844 | B1 | * | 6/2002 | Bruner et al. | 174/17 VA |

FOREIGN PATENT DOCUMENTS

| CN | P2000-139006 | * | 5/2000 |
| CN | 2615008 Y | | 5/2004 |
| CN | 2652000 Y | | 10/2004 |
| EP | 1 343 233 A2 | | 9/2003 |
| JP | 4-124811 U | | 11/1992 |
| JP | 08-019125 | | 1/1996 |
| JP | 9-93730 A | | 4/1997 |
| JP | 2000-139006 | | 5/2000 |
| JP | 2000-228803 | | 8/2000 |
| JP | 2007-020295 | | 1/2007 |

OTHER PUBLICATIONS

Authorized Officer: Jozsef Schwarczkopf, Written Opinion and Search Report received in Singapore Patent Application No. 200809093-8, Oct. 13, 2011, 13 pp., Hungarian Intellectual Property Office.
Taiwanese Office Action received in Taiwan Patent Application No. 097143336, mailed: Jan. 2, 2012, 7 pp., Taiwan Patent Office, Taiwan.

* cited by examiner

*Primary Examiner* — Truc Nguyen
(74) *Attorney, Agent, or Firm* — Mattingly & Malur, P.C.

(57) ABSTRACT

A switchgear case is partitioned into a high voltage bus bar chamber, which contains bus bars and cable heads, a high voltage device chamber containing circuit breakers and operation mechanisms and a low voltage control chamber containing a relay and measurement devices, etc. A rear wall of the case has a first suction port disposed at a lower part thereof, wherein the high voltage bus bar chamber, high voltage device chamber and the low voltage control chamber are communicated and air passing through the chambers is discharged from a first discharging port of the casing. The bus bars electrically connecting the high voltage devices in the high voltage device chamber and connecting bars connecting the adjoining bus bars and the cable heads are covered with solid insulators for solid-insulation.

9 Claims, 3 Drawing Sheets

SWITCHGEAR

CLAIM OF PRIORITY

The present application claims priority from Japanese patent application serial No. 2007-325716, filed on Dec. 18, 2007, the content of which is hereby incorporated by reference into this application.

THE FIELD OF THE INVENTION

The present invention relates to a switchgear with improved dust prevention performance and maintenance saving.

RELATED ART

Switchgears generally comprises a casing enclosing a high voltage cable chamber containing at least bus-bars and cable heads, a high voltage device chamber containing at least two circuit breakers, and a low voltage control chamber containing at least measurement instruments and relays. The three chambers are substantially independent from each other, while the air for cooling the devices, etc. in the chambers is communicated and circulated towards an air discharging port. In the above switchgear there are various air circulation systems so as to keep clean the inside of the casing and to suppress temperature rise inside. For example, Japanese patent laid-open 2000-228803, Japanese patent laid-open H08-19125, Japanese patent laid-open 2000-139006, Japanese patent laid-open 2007-20295, etc disclose different switchgears having cooling systems. By forming the air circulation in the casing, the dust in the casing is blow out from the casing and temperature in the casing is lowered simultaneously. In the prior art such as Japanese patent laid-open H08-19125 a filter is formed at the bottom wall of the casing on which a transformer is placed. However, this structure is not effective to circulate air in the casing. The suction port may become an obstacle to the airflow. Japanese patent laid-open 2000-228803 has the same problem.

In Japanese patent laid-open 2000-139006 the high voltage devices such as circuit breakers are placed in the airflow. However, the airflow that communicates with the suction port contains dust, etc and the high voltage devices may be easily soiled with the dust, etc.

In Japanese patent laid-open H08-19125 cables, bus bars and cable heads are exposed to the airflow. Therefore, the cables, bus bars or cable heads may be soiled with dust, etc in the airflow. This means the cables or cable heads should be frequently maintained or cleaned. This problem may arise from the technology disclosed in Japanese patent laid-open 2000-228803.

In Japanese patent laid-open 2007-20295 a plurality of fans are used to pressure the inside of the casing and circulate air in the casing. This structure, of course, makes large the switchgear size and increases a cost of the switchgear.

SUMMARY OF THE INVENTION

It is an object of the present invention to provide a switchgear that has improved dust prevention performance and maintenance saving, while keeping good heat dissipating performance.

The present invention provides a switchgear comprising: a casing partitioned into at least four chambers comprising a high voltage bus bar chamber, which contains at least bus bars and cable heads, a high voltage device chamber containing at least circuit breakers and a low voltage control chamber containing at least a relay and measurement devices, wherein the casing for three chambers is constituted by a rear wall, a front wall opposed to the rear wall, a bottom wall, a top wall opposed to the bottom wall, and side walls each connected to the top wall, bottom wall, front wall and rear wall, the rear wall having a first suction port disposed at a lower part thereof, wherein the high voltage bus bar chamber, high voltage device chamber and the low voltage control chamber are communicated with air and air passing through the chambers is discharged from a first discharging port of the casing, wherein bus bars electrically connecting the high voltage devices in the high voltage device chamber and connecting conductors 25 connected to connecting bars 7' to connect the adjoining bus bars are covered with solid insulators for solid-insulation.

The bus bars 7 are insulated with hard thermoset resin and the connecting bars 7' are insulated with a flexible resin. The hard thermoset resin may preferably be an epoxy resin and the flexible resin may preferably be a silicone rubber. The high voltage device chamber contains at least two circuit breakers, such as vacuum circuit breakers, each of which is contained in a container or a closing cover 3 isolated from the high voltage bus bar chamber and the low voltage control chamber, each of the containers having a fine filter disposed between the high voltage cable chamber and high voltage device chamber, the fine filters allow only very small dust particles or only gaseous substances such as air or steam to pass therethrough.

The high voltage bus bar chamber, the high voltage device chamber and the low voltage control chamber are communicated with air by means of fine filters 14, 16 to a second filter disposed to the top wall 1B or the like. The first suction port 9 and the first filter 10 are disposed at a lower part of the rear wall, a second suction port 11 and third filter 12 are disposed in the partition wall 1F between the high voltage bus bar chamber 2 and the high voltage device chamber 4, and a first exhaust port or discharging port 17 and second filter 20 are disposed in the top wall 1B or the like.

A second discharge port 18 and a fourth filter 22 are disposed above the low voltage control chamber 5. The pore size of the first filter 10 is larger than that of the second filter 20, and the pore size of the third filter 12 is smaller than that of the first filter 10.

The pore size of the fourth filter 22 is smaller than that of the third filter 12. The fifth and sixth filters allow only very small dust particles or gaseous substance such as air, steam, etc, to pass therethrough. The second filter 20 and fourth filter 22 may be omitted.

According to the present invention, the cables, connecting bars or bus bars and cable heads in the high voltage bus bar chamber are firmly insulated and protected from dust, moisture, salts, etc in the airflow. And, devices in the high voltage device chamber, such as circuit breakers are isolated substantially completely from dust, moisture, salts, etc. The airflow in the casing is formed by natural circulation by the action of upward airflow caused by heat generated in the heat generating components in the casing from the lower part of the casing toward the top portion of the casing, the dust, etc is easily flown out and heat is dissipated to outside the casing. Therefore, reliability of the switchgear of the present invention will be remarkably improved. As a result, the switchgear of the present invention is featured by low-cost, anti-dust structure and remarkable maintenance saving.

DETAILED DESCRIPTION OF THE PREFERRED EMBODIMENTS

Figure 1:
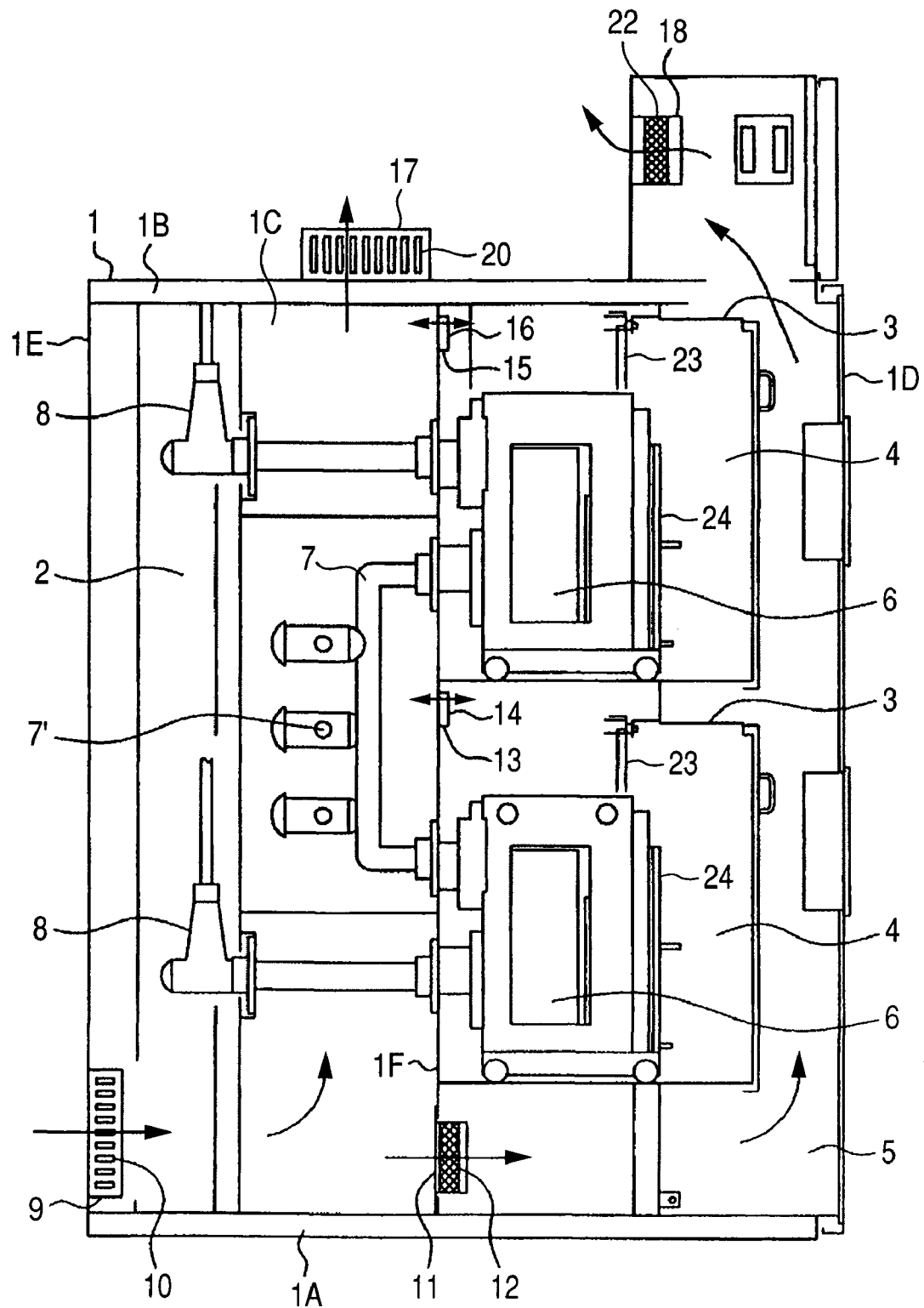
FIG. 1 is a cross-sectional side view of a unit switchgear of the present invention.

First of all, some of the features of the switchgear of the present invention will be listed and explained below. The switchgear of the present invention should have one or more features.

The switchgear of the present invention comprises:

(1) A casing partitioned into at least three chambers, i.e. a high voltage bus bar chamber, which contains at least bus bars and cable heads, a high voltage device chamber containing at least circuit breakers and a low voltage control chamber containing at least a relay and measurement devices. The casing should cover and protect the necessary components of the switchgear from environment.

(2) The casing is constituted by a rear wall, a front wall opposed to the rear wall, a bottom wall, and a top wall opposed to the bottom wall, the rear wall having a first suction port disposed at a lower part thereof, the top wall having an exhaust port disposed above the high voltage bus bar chamber or in the top wall, wherein the high voltage bus bar chamber and the high voltage device chamber are partitioned.

(3) The lower part of the high voltage device chamber and the low voltage control chamber are air-communicated by means of a second suction port and a filter, and the high voltage device chamber is divided into at least two device sections each of which accommodates a circuit breaker.

(4) The device containers or closing cover 3 for the high voltage devices are independent from each other and each of the device containers or closing covers is communicated with the high voltage bus bar chamber by means of fine filters 14, 16.

(5) The bus bars and cable heads in the high voltage cable chamber are covered with solid insulators. The bus bars and the cable heads are insulated with epoxy resin, and the connecting bars connected to connecting conductors for connecting the adjoining bus bars are insulated with flexible silicone rubber. Since the connecting bars are moved when the unit switchgears are moved or replaced, the solid insulator should be flexible. The first suction port 9 allows relatively large sized dust, etc to flow into the high voltage bus bar chamber. The air containing dust flows upwards by the action of a rising airflow in the bus bar chamber, etc. The cable heads and bus bars are not soiled at all by the dust because they are completely covered with solid insulators.

(6) The containers for the circuit breakers are independent from each other and from the high voltage bus bar chamber and low voltage control chamber. However, each of the containers or closing covers communicates with the high voltage bus bar chamber by means of fine filters 14, 16 disposed in the suction-discharge ports 13, 15. Since the fine filters have a very small pore size, they allow only very small dust particles or salts or only gaseous substances such as air, steam to path therethrough. Accordingly, the inside of the containers is kept clean all the time.

(7) The preferable relationships of pore sizes among the filters 10, 12, 14, 16, 20, 22 are as follows.

The pore size of the first filter 10 is the largest in the filters. The first filter 10 functions to remove relatively large dust particles. The pore size of the second filter 20, if used, may be the same of that of the first filter 10 or smaller than that of the first filter 10.

The pore size of the third filter 12 is smaller than that of the first filter 10 and, preferably than that of second filter 20, if used. The pore size of the fourth filter 22 is preferably smaller than that of the second filter 20 or the third filter, but may be the same as that of the third filter 12.

Figure 2:
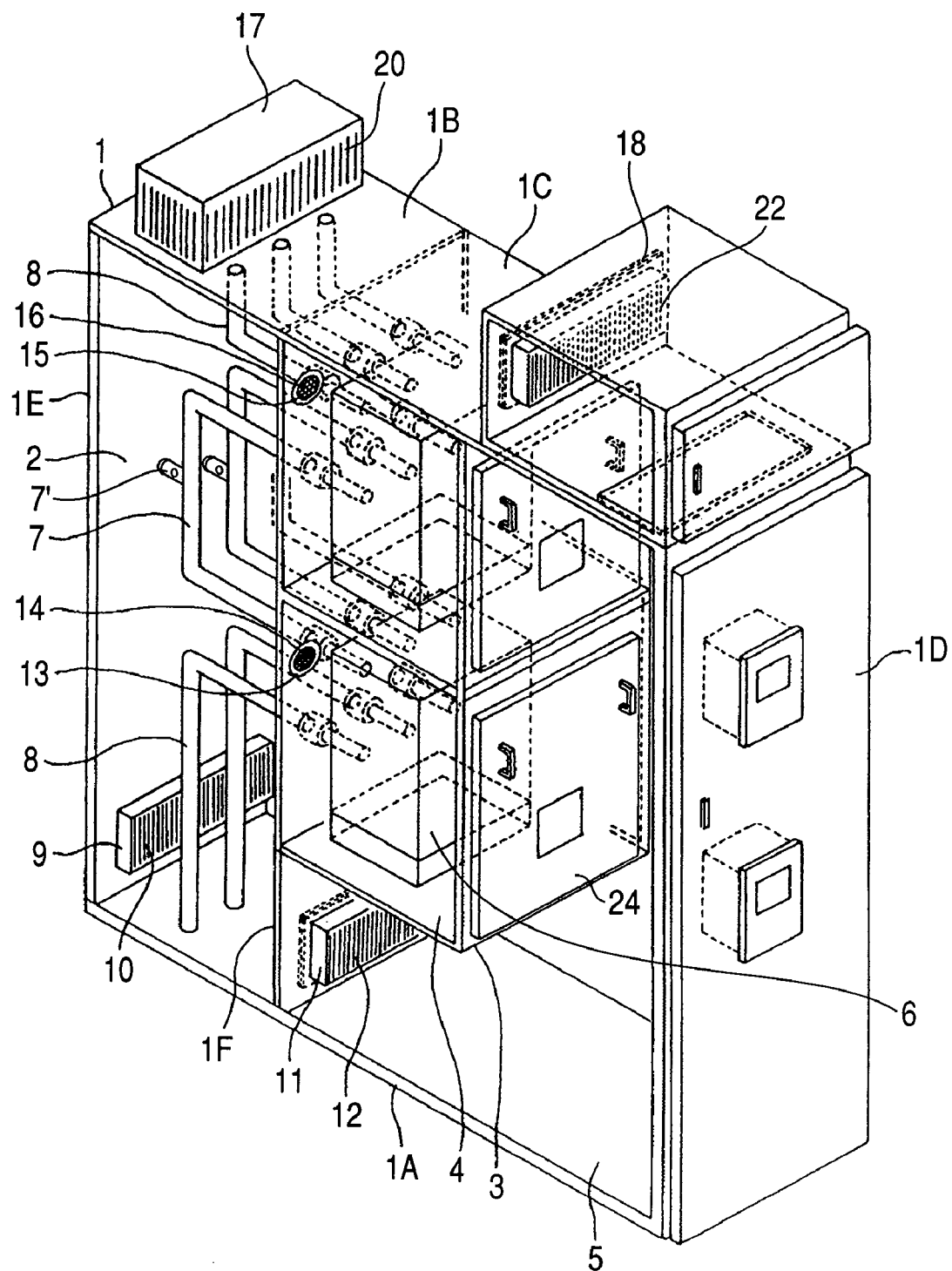
FIG. 2 is a perspective view of the unit switchgear shown in FIG. 1.
Figure 3:
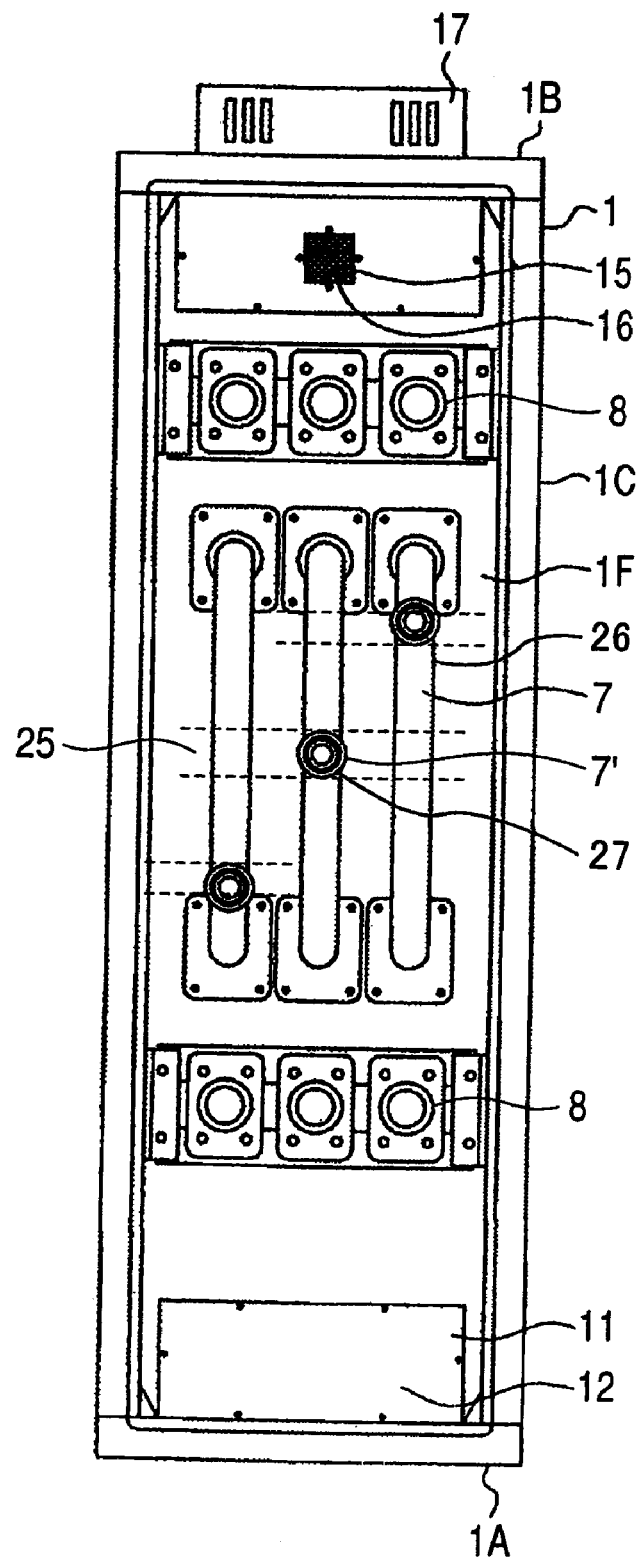
FIG. 3 is a rear side view of the unit switchgear shown in FIGS. 1 and 2 of the present invention.

In the following the embodiment of the present invention will be explained. FIGS. 1 to 3 show the embodiment of the switchgear of the present invention. In these figures a main body or a casing 1 of the switchgear is constituted by a bottom wall 1A, a top wall 1B, and side walls 1C between the top wall and the bottom wall. The casing has a front door 1D and a rear door 1E. The doors are used when the switchgear is inspected or repaired or subjected to replacement of components.

The casing comprises a high voltage bus bar chamber 2, which is constituted by the bottom wall 1A, the top wall 1B and a partition wall 1F. The high voltage bus bar chamber is generally positioned at the backward side of the casing 1. The two high voltage device chambers 4 are formed between the high voltage bus bar chamber 2 and a low voltage control chamber 5 by a containers or closing covers 3. The container 3 of the device chamber includes circuit breakers 6, which are structurally isolated from airflow in the casing 1 by doors 24 and partitions 23. The container 3 also includes an operation mechanism (Not shown) connected to movable electrodes of the circuit breakers. This does not mean that the containers for the vacuum circuit breakers 6 are air-tightly isolated from the low voltage control chamber 5 and from the high voltage bus bar chamber 2. The partitions 23 are disposed to prevent from inserting of hands or finger of an operator at the time of maintenance or other jobs. The casing 1 has the front door 1D to open the switchgear at the time of maintenance or other jobs. The circuit breakers 6 are withdrawing type, and they can be withdrawn from the main body with handles disposed on the door 24 of the container.

The high voltage bus bar chamber 2 confines high voltage bus bars 7, which are covered with a solid insulator such as epoxy resin. The connecting bars 7' are covered with a flexible solid insulator such as silicone rubber. Since the connecting bars 7' may be moved when one or more of the bus bars are replaced or connected to connecting conductors, the connecting bars 7' should be flexible. The bars 7' stand up from the connecting portions of the solid-insulated conductors 7, as shown in FIG. 2. In general, the vacuum switchgear is used in combination of two or more unit switchgears shown in FIGS. 1-3. Therefore, the solid insulated conductors are connected to those of the adjoining switchgears. Connecting rods 25 (dotted lines) are extending in a horizontal direction to connect the solid-insulated bus bar 7 of the adjoining switchgears.

The solid insulators of the bus bar 7 and connecting bar 7' are covered with earth layers 26, 27.

The cable heads 8 connected to the fixed electrodes of the circuit breakers are also covered with a solid insulator such as epoxy resin. The components are electrically insulated from the surrounding for protecting them from humidity, salts or dust. Accordingly, the maintenance of the cable heads, connecting bars and bus bars are very simplified and time saving. The air that contains dust, etc naturally flows upwards and flows out from the first discharging port 17 by the action of natural circulation by heat generated in the bus bars, cable heads and connecting bars. Since the bus bars, etc are solid insulated, large particle dust, etc passed through the first filter does not damage them. In order to accelerate suction of air as much as possible, the cross sectional area of the first suction port and the pore size of the first filter should be sufficiently large.

A part of the air flown from the first filter may go through the third filter 12, which has a pore size smaller than that of the first filter, into a lower part of the high voltage device chamber. Since the high voltage devices such as vacuum circuit breakers 6 are covered in the closing cover 3, the dust contained in the airflow does not damage or soil them. The containers for the vacuum circuit breakers may breathe by means of the fine filters 14, 16 made of Gore-Tex (Registered trademark), a film for passing only gaseous substances. The air containing small size dust flows upwards along the low voltage control chamber towards the second discharging port 18, while cooling the equipments such as relays, timers, etc.

The pore size of the fourth filter 22, if used, is preferably the same as that of third filter 12. According to the above-explained structure, the cooling air flows via necessary loops to cool the components. The components of high voltage are highly protected from environment containing dust, salts and humidity; the maintenance of the components is remarkably simplified or timesaving. The heat generating components as well as other components are effectively cooled down by the airflow, because an amount of which can be made sufficiently large, keeping its cleanness.

Circuit breakers 6 and their operation mechanisms (not shown) are installed in high voltage device chambers 4. This embodiment shows two circuit system, which shows two high voltage chambers 4 and two circuit breakers 6. Cable heads 8 are connected to fixed electrodes of the circuit breakers 6. Measurement instruments, relays, etc are disposed on the rear side of the front door 1D that constitute the low voltage control chamber 5.

Below the rear side door 1E disposed is a first filter 10 in the first suction port 9 for taking outside air into the high voltage bus bar chamber 2. The third filter 12 is disposed in the third suction port 11 for taking the air into the low voltage control chamber 5 below the partition wall 1F. The fifth filter 14 and sixth filter 16 for discharging air heated by heat generated in the high voltage device chambers 4 are disposed in the first suction-discharge port 13 and second suction-discharge port 15, respectively, formed in the partition wall 1F. The second filter 20 is disposed in the first discharge port 17 for discharging air heated by heat generated in the high voltage bus bar chamber 2 in the top wall 1B. The fourth filter 22 is disposed in the second discharge port 18 for discharging air heated by heat generated in the low voltage control chamber 5 above the top wall corresponding to the high voltage device chamber 4. The second discharge port 18 is opened not in the front side, but in the rear direction of the main body for protecting operators or inspectors. The first discharge port 17 is also opened in the upper direction. The second filter 20 and forth filter 22 can be omitted.

Since a large quantity of heat is generated from the solid-insulated high voltage bus bars 7 and connecting buses 7' at the time of current flow, an area of the suction port 9 in the rear wall 1E is large so as to intake a large amount of air for cooling. The first filter 10 has such a pore size or filter pore size that relatively large dust particles such as 5 μm or more can pass through it. The first filter 10 should have an airflow resistance as small as possible.

The heat generated in the high voltage device chamber is discharged into the low voltage control chamber 5 and equipments in the low voltage control chamber 5 are protected from the dust, etc. Since a quantity of heat generated in the low voltage control chamber is smaller than that in the heat generated in the main circuit, an amount of air for cooling can be smaller than that of the air taken into the high voltage bus bar chamber 2. Therefore, a sectional area of the second suction port 11 can be made smaller than that of the first suction port 9. The pore size of the third filter 12 can be made smaller than that of the first filter 10, such as 1 μm or less.

In order to protect the high voltage devices in the high voltage device chambers 4 from the dust, etc the fifth filter 14 and sixth filter 16 may allow the dust particles of 0.1 μm or less to pass. The high voltage device chambers can breathe through the filters 14, 16, but they do not allow the dust, etc to enter the chambers so that the high voltage devices such as circuit breakers, operation mechanisms, etc are highly protected from the dust. The filter materials for the fine filters 14, 16 are filters that allow only very fine dust particles or gaseous substance to pass through. Gore-Tex is an example of the materials suitable for the fifth and sixth filters.

What is claimed is:

1. A switchgear comprising:
a casing partitioned into at least four chambers comprising a high voltage bus bar chamber, which contains at least bus bars and cable heads, a high voltage device chamber containing at least circuit breakers and a low voltage control chamber containing at least a relay and measurement devices, wherein the casing is constituted by a rear wall, a front wall opposed to the rear wall, a bottom wall, a top wall opposed to the bottom wall, and side walls each connected to the top wall, bottom wall, front wall and rear wall, the rear wall having a first suction port disposed at a lower part thereof, wherein the high voltage bus bar chamber, the high voltage device chamber and the low voltage control chamber are communicated and air passing through the chambers is discharged from a first discharging port of the casing, the first suction port being provided with a first filter,
a second suction port provided with a third filter being disposed between the high voltage bus bar chamber and the low voltage control chamber,
wherein bus bars electrically connecting the high voltage devices in the high voltage device chamber and connecting bars connecting the adjoining bus bars and the cable heads are covered and insulated with solid insulators, and wherein the second suction port has a smaller cross sectional area than the first suction port, and the third filter has a smaller pore size than the first filter.

2. The switchgear according to claim 1, wherein the bus bars are insulated with hard thermoset resin and the connecting bars are insulated with a flexible resin.

3. The switchgear according to claim 2, wherein the hard thermoset resin is an epoxy resin and the flexible resin is a silicone rubber.

4. The switchgear according to claim 1, wherein the surfaces of the solid insulators are covered with an earthing film to earth the solid insulators.

5. The switchgear according to claim 1, wherein the high voltage device chamber contains at least two circuit breakers, each of which is contained in a container isolated from the high voltage bus bar chamber and the low voltage control chamber, each of the containers having a fine filter disposed between the high voltage bus bar chamber and high voltage device chamber, the fine filters allowing only very small dust particles or only air to pass therethrough.

6. The switchgear according to claim 1, wherein the first discharging port is provided with a second filter and is disposed in the top wall.

7. The switchgear according to claim 1, wherein a second discharge port and a fourth filter are disposed above the high voltage device chamber.

8. The switchgear according to claim 1, wherein the pore size of the first filter is larger than that of the second, third, fourth and fine filters, and the pore size of the third filter is smaller than that of first filter.

9. The switchgear according to claim 1, wherein the pore size of the fourth filter is smaller than that of the third filter.

* * * * *